Patented Feb. 15, 1938

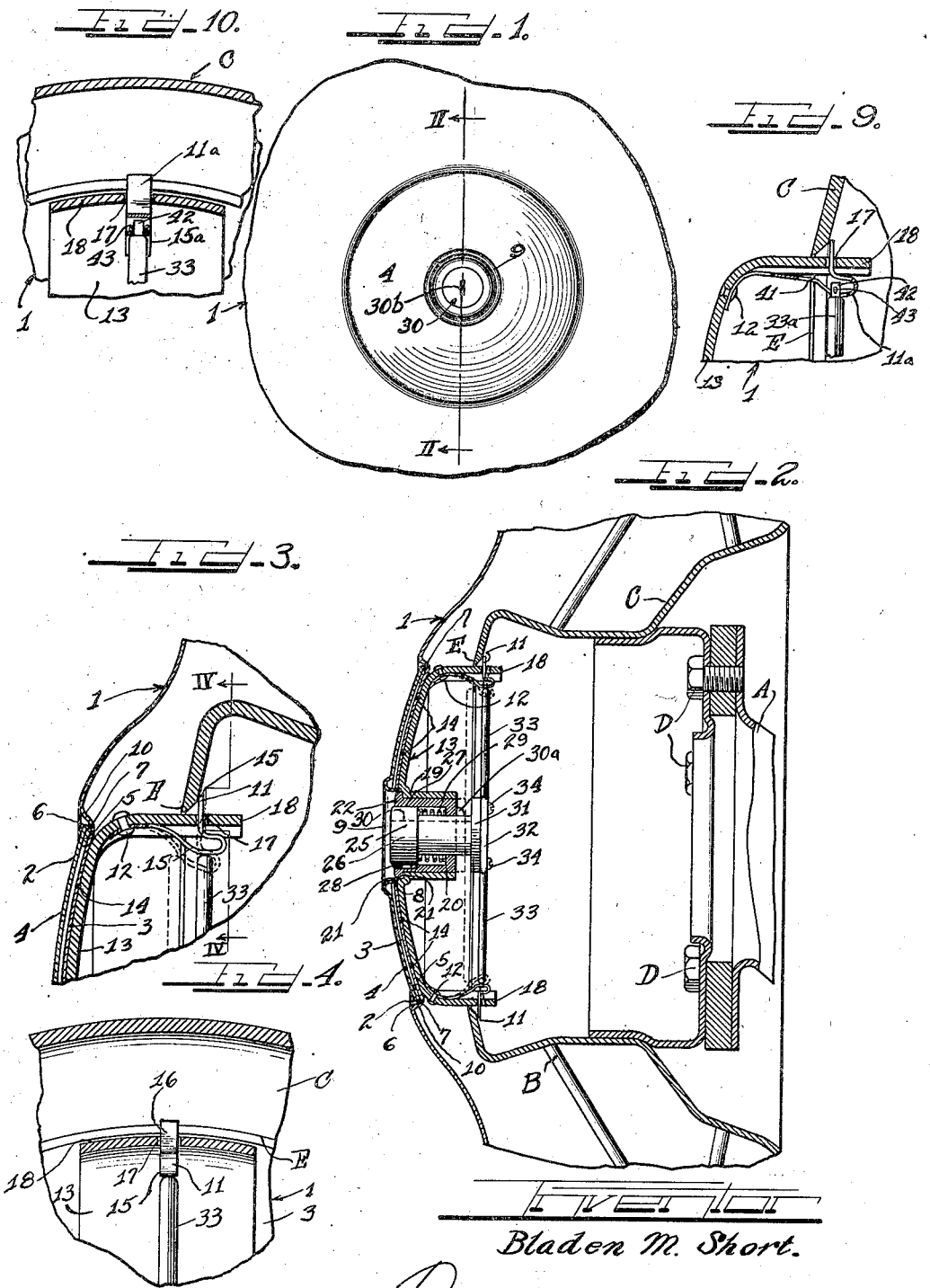

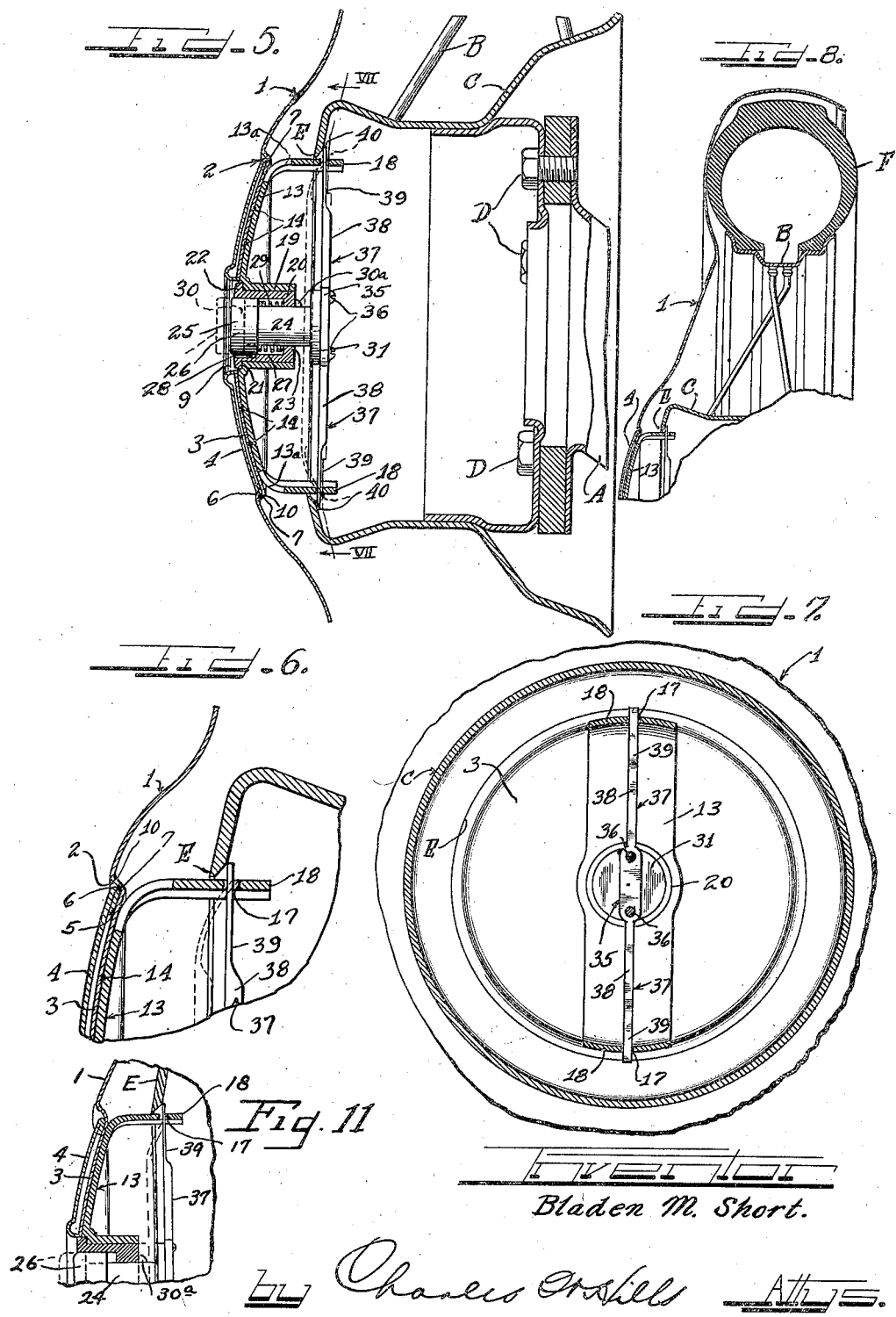

2,108,145

UNITED STATES PATENT OFFICE 2,108,145

WHEEL ASSEMBLY

Bladen M. Short, Detroit, Mich., assignor, by mesne assignments, to Houdaille-Hershey Corporation, Detroit, Mich., a corporation of Michigan Application October 21, 1933, Serial No. 694,541

9 Claims. (Cl. 150—54)

This invention relates to tire covers and is concerned more particularly with a means for locking the cover on the hub of a spare wheel carrying the spare tire to be covered.

It is an object of the invention to provide a tire cover formed centrally thereof in a manner simulating a hub cap preferably duplicating a customer's design of hub cap.

It is another object of the invention to provide an improved locking means for cooperation with the hub of the spare wheel to operate readily and effectively to lock a cover to the hub, and yet readily releasable to enable the cover to be removed from the hub.

It is a further object of the invention to provide a member which combines the function of enclosing a lock housing with the function of guarding the locking elements cooperating bodily with the spare wheel hub to hold the elements in locked position.

Another object of the invention resides in the provision of reinforcing means for the central part of a tire cover, said reinforcing means preferably constituting a false hub cap duplicating the automobile manufacturer's design.

It is a further object of the invention to provide, in a tire cover structure, locking means including radially movable spring elements controlled by a key or other theft-defying means.

In accordance with the general features of the invention, a tire cover which may be formed either to cover a side wall or to cover side wall and tread portions of a spare tire and to conceal the outer side of a spare wheel is arranged to receive and have secured thereto a plate which may be dished to simulate the head of a hub cap. The head and cover structure are preferably of sheet metal and may be given any desired design, the cap being preferably the design of the hub cap of the car with which the cover is to be used. Improved locking mechanism constitutes an important feature of the invention. In accordance with one form, such locking mechanism includes a lock housing preferably mounted centrally of the cover and including a spring pressed lock plunger which is normally arranged so that the retaining elements thereof are positioned within and beyond the rim of the front side of the hub and engaged therewith to thereby lock the cover in position. By operating a key controlled tumbler device, the plunger may be released to enable the same to be forced by the spring means forwardly in a manner to release the retaining elements. Such elements, when straight, are arranged in their locking positions, and are bent by the opening of the lock until they are disposed radially inwardly of the rim of the hub opening to enable said elements to pass therethrough.

In accordance with another form of the invention, the retaining instrumentalities include substantially radially disposed pins which are positively movable forwardly to provide clearance so that the retaining elements themselves will be retracted by their own resilience until they are disposed radially inward of the rim of the hub opening to enable said elements to pass therethrough.

The construction is extremely simple and effective, involves a minimum of parts which are readily manufactured and assembled at low cost. The cover as a whole has the general form of the exposed side of the spare wheel and tire, and, with its false hub cap, presents a very attractive appearance in harmonizing with the hub caps employed on the vehicle supporting wheels.

Other important objects and advantages of the invention will appear as the description proceeds.

This invention (in preferred forms) is illustrated in the drawings and hereinafter more fully described.

On the drawings:

Figure 1 is a fragmentary elevational view of a tire cover and lock structure embodying the principles of the invention.

Figure 2 is an enlarged fragmentary sectional view taken substantially in the plane designated by the line II—II in Figure 1.

Figure 3 is an enlarged view of details of the locking instrumentalities shown in Figure 2.

Figure 4 is a fragmentary sectional view taken substantially as shown by the line IV—IV in Figure 3.

Figure 5 is an enlarged fragmentary sectional view similar to Figure 2 but showing a modified form of locking mechanism.

Figure 6 is an enlarged view of certain details of the locking instrumentalities shown in Figure 5.

Figure 7 is a fragmentary sectional view taken substantially as indicated by the line VII—VII in Figure 5.

Figure 8 is a fragmentary sectional view showing one way in which the cover may be formed and disposed for preventing rattling of the locking unit in the hub.

Figures 9 and 10 are views similar to Figures 3 and 4, respectively, of a modified form of the invention.

Figure 11 shows another form of the invention.

As shown on the drawings:

Referring now more particularly to the drawings, a tire carrier shown fragmentarily at A and permanently secured in a conventional manner to an automobile body either at the sides or at the rear or elsewhere as desired is shown supporting a spare wheel B through its hub C, with the supporting bolts D accessible through the front opening E of the hub.

The invention is particularly concerned with a cover or guard construction embodying mechanism whereby the same may be releasably locked to the hub E. The tire cover 1 which is chosen here for illustrative purposes is of the disc or drum type formed to substantially conceal the outer side of the spare wheel and tire and shaped to conform generally with said sides to substantially simulate the same. The central portion of the cover is accordingly bulged in front to be disposed in front of the wheel hub. The bulged portion of the cover is formed on its forward side with a preferably circular depression 2 of a diameter approximating that of the hub cap designed for use with the particular wheel hub. It is, however, not necessary that the depression be circular since it may be polygonal or otherwise shaped in accordance with the shape of the particular hub cap design employed in connection with the vehicle supporting wheels.

The bottom or floor 3 of the depression 2 may be flat but is preferably concavo-convex with its convex surface foremost to lend rigidity to the central structure of the tire cover, and in the depression is received a preferably similarly formed plate 4 which preferably has the same surface as well as contour design of the hub caps to be employed in connection with the wheels of the car upon which the tire cover 1 is to be mounted. The plate 4 is not a part of a hub cap itself, however, but serves as a false hub cap for the sake of a harmonious appearance. The plate 4 has its outer peripheral margin bent inwardly rearwardly upon itself at 5 to provide a smooth outer peripheral edge 6 for convenience in handling as the parts are assembled. The plate 4 is moreover secured preferably permanently within the depression 2, as by welding at its rear peripheral margin as shown at 7, in order not to disturb the surface design of the plate 4. However, if desired, the plate 4 may be secured in position by any other suitable means.

The depression bottom 3 is formed with a central opening 8, as is also the plate 4 at 9. The plate 4 at its inner periphery is preferably bent forwardly and then rearwardly so that the opening 9 is flared, the adjacent edge of the plate terminating within the opening 8 in the depression bottom 3 to thereby provide protection from the exposed rough edge of said opening. The plate 4 is formed to fit the outer peripheral wall 10 of the depression 2, so that the plate 4 may be readily positioned therein in centered relation to the cover and occupy substantially the same position, centrally, that would be occupied by a real hub cap when mounted upon the hub C. The opening 9 is provided for the purpose of allowing access of a key to the locking instrumentalities now to be described.

The locking instrumentalities for cooperation with the hub C of the spare wheel B in accordance with one form of the invention include spring retainers 11 which, as illustrated, may be substantially L-shaped and riveted at 12 or otherwise suitably secured at their forward ends to a base 13, the latter in turn being spot welded at 14 or otherwise suitably secured to the depression bottom 3 of the tire cover 1. Each spring 11 is thus mounted in cantilever fashion, extending rearwardly from the securing means 12 and also inwardly, then bent outwardly and forwardly upon itself and then again bent outwardly in a generally radial direction at approximately a right angle to the secured portion thereof. The inwardly bent portion provides a cam surface 15, and the free extremity 16 of each spring 11 is arranged, when the spring is unstressed, radially inward of the rim E of the hub opening in order to pass freely therethrough. The free portion 16 of the spring 11 is received in an opening 17 formed in each of the rearwardly extending arms 18 of the generally U-shaped base 13, and is guided by the walls of said opening and also prevented from being improperly displaced.

The base 13 preferably is in the form of a strap fitting substantially diametrically the inner surface of the depression bottom 3 and is formed with a central cylindrical boss 19 extending rearwardly and in substantially coaxial relation to the opening 9 in the plate 4. The cylindrical boss 19 receives with a press fit a locking barrel sleeve 20 and is rabbeted at 21 at its forward end to receive the sleeve flange 22, which terminates substantially at the terminal edge of the inner periphery of the plate 4 at the opening 9. The sleeve 20 and boss 19 are thereby rigidly secured together.

The sleeve 20 is formed with a radially inwardly extending flange 23 at its rear end, providing a bearing for the stem 24 of the lock barrel 25. The barrel 25 is enlarged at its forward end 26 to have a sliding fit in the enlarged bore 27 of the sleeve 20, and is splined thereto at 28 to permit relative axial but prevent relative rotary movement therebetween. A spring 29 is disposed in the sleeve 20 between the flange 23 thereof and the head 26 of the barrel 25, and is preferably at all times compressed so that it constantly urges the barrel 25 in a forward or outward direction. The barrel 25 houses a rotary lock cylinder and associated plunger designated generally by the reference character 30 and of any conventional construction operated by a key and preferably controlled by tumblers, the cylinder being mounted to rotate but not move axially relative to the barrel 25 as is well known in the art of locks of this general character. With the parts arranged as shown in full lines, the latch pin 30a is in locking position, and may be spring pressed to snap the same into locking position when the barrel 25 is being forced rearwardly. When the pin 30a is retracted, sufficiently to pass through the bearing afforded by the flange 23, the spring 29 moves the barrel 25 and associated locking instrumentalities forwardly until arrested by the plate 31, abutting the rear end of the barrel 20 as shown in dotted lines in Figure 2.

The cam structure for cooperating with the cam surfaces 15 of the retaining or locking springs 11 is mounted upon the barrel 25 at the plate 31 thereof. This cam structure comprises a central body 32 and oppositely directed pins 33. The body 32 is non-rotatably secured to the plate or abutment member 31 of the barrel 25 by studs 34. The pins 33 are disposed in substantial alignment with the springs 11 and are capable of limited movement in the plane of the springs 11 throughout a distance equal to the maximum distance between the abutment plate or member 31 and the flange 23 of the bearing sleeve 20. The pins 33, when in their rearmost positions, hold the springs 11 locked behind the front part of the hub C as shown. In their retracted positions as shown in dotted lines in Figures 2 and 3, the pins 33, by virtue of the outwardly curved adjacent cam surfaces of the springs 11, permit the springs 11 to extend inwardly as shown by the dotted lines in Figures 2 and 3, sufficiently to readily clear the rim of the opening E at the front of the hub C. It is obvious that the key for the locking cylinder and associated instrumentalities 30 may be manipulated to place the pins 33 in locked or released positions, as desired.

The latch pin 30a of the locking instrumentalities 30 is preferably rounded at its front side as shown and as employed in conventional lock constructions and is preferably spring pressed so that said plunger may be depressed by the front side of the flange 23 as the barrel 25 is forced against the spring 29 to the rear, the pin 30a immediately snapping outward to engage the rear side of the flange 23 and thereby hold the pins 33 and consequently the retaining springs 11 in locked positions as shown in full lines in Figures 2 and 3.

The cover 1, when employed in connection with locking instrumentalities such as those above described, is of such character that, when the spring elements 11 are in their locked positions, the cover engages a suitable abutment such as the front or outer side of the spare tire (as in Figure 8) or any other desired abutting means such as the vehicle body itself, so that such abutment will cooperate with the locking spring elements 11 in preventing rattling of the cover locking means within the hub C.

When the spring elements 11 are locked they extend in substantial radial alignment with the camming pins 33, so that the portion of each spring element 11 extending outwardly from the corresponding pin 33 is substantially inflexible in a radial direction and cannot be accidentally or even intentionally forced radially inward to pass through the opening E in the hub C unless said pins are retracted by manipulation of the proper key. The walls of the openings 17, through which the spring elements 11 extend, cooperate with the pins 33 in preventing undesired displacement of the spring elements from their locked positions, the elements 11 being preferably formed of sufficiently rigid material to resist bending thereof.

The locking instrumentalities above described, it will be observed, are extremely simple, involving parts which are made either of sheet metal or of inexpensive stampings, substantially the only machining required being such as may be connected with the manufacture of the locking tumbler mechanism.

A mere partial turn of the tumbler locking cylinder by employing the proper key will retract the holding plunger thereof sufficiently to allow the spring 24 to release the locking instrumentalities and permit the cover to be removed. In the application of the cover, after the cover is positioned against the abutment means aforesaid, and the spring elements arranged in their dotted line positions relative to the hub C as shown in Figures 2 and 3, said spring elements may be forced into their locking positions as shown in full lines in said figures by a mere push on the barrel 25 against the pressure of the spring 24, causing the latch pin 30a of the locking means to move rearwardly beyond the flange 23 and thereafter snap into locking position as shown in Figure 2. Sufficient clearance is provided between the rim of the opening E in the hub C and the extremities 16 of the spring elements 11 when said elements are in their retracted positions, to enable the elements to be passed through the opening E readily when the cover is being applied or removed, the outline of the cover in relation to the spare tire and adjacent structure providing assistance for the proper positioning of the locking instrumentalities in substantially coaxial relation to the hub C.

While the instrumentalities constituting the locking mechanism above described are controlled by means of a key properly insertable into the keyhole 30b, it is to be understood that locking means controlled by other means could also be adapted for use in connection with the present invention, to retract the latch pin 30a to enable the spring elements 11 to be shifted into unlocked positions.

A somewhat modified form of the invention is shown specifically in Figures 5, 6 and 7. This modified form of the invention differs from that heretofore described only in respect to the structure corresponding to the pins 33 and spring elements 11. This modified structure includes, instead of pins 33 and separate spring elements 11, a body 35 fixedly secured as by studs 36 to the plate or abutment member 31 and is preferably formed of spring metal such as spring steel. The body 35 is provided with oppositely extending stems 37 of sufficient thickness throughout a substantial distance outwardly thereof to be substantially unyielding as shown at 38. The remaining and outermost portions 39 of the stems 37 are of susbtantially reduced thickness to render the same relatively flexible.

It will be clear, especially after considering the previously described form of the invention, that when the cover is locked in position as shown in Figures 5, 6 and 7, the outer extremities 39 of the stems 37 cannot be made to flex so that the cover is securely locked to the hub C, and when it is desired to release the locking instrumentalities, the proper key is manipulated to retract the latch pin 30a of the locking mechanism to enable the spring 29 to force the body 35 and stems 37 thereof forwardly to the position shown in dotted lines in Figures 5 and 6. Since this movement is relative to the base 13, the extremities 39 are caused to flex as shown in dotted lines, with the result that their free ends 40 are withdrawn to positions radially inward of the rim of the hub opening E, thus enabling the cover to be removed. The spring 29 is formed to exert sufficient pressure, when released by the key, to overcome the resistance of the extremities 39 to deflection, so that such deflection will readily take place when the spring 29 is made effective to exert pressure forcing the barrel 25 and associated parts forwardly.

If desired, the stems 37 may be normally in the shape shown in dotted lines in Figures 5 and 6, with the extremities 39 naturally bowed rearwardly. In such event, the spring 29 could be omitted, since the extremities 39, when in the full line position, would constantly exert a forward pressure on the barrel 25 because of the tendency of said extremities to assume the bowed positions. In such event, moreover, said extremities 39 would be straightened out and thus forced into locking position in engagement with the rear face of the forward position of the hub C, in response to rearward pressure upon the barrel 25. Thus the portions 39 would perform the same function as the spring 29 in the constructions heretofore described. This modification is illustrated in Figure 11.

The number of arms 18, spring retaining elements 11, pins 33 and stems 37 may be varied as desired, two of each being included in this description for illustrative purposes only.

The stems 33 and cooperating spring elements 11, and the mechanism comprising the stems 37 with their free ends 39, constitute in effect toggle devices, since movement of the center of each of said mechanisms in one direction results in movement of the ends of said mechanism oppositely at substantially right angles to said direction.

The spare tire carrier A, on which the spare wheel B and spare tire G are mounted at the hub C by the bolts D, accessible preferably only from the front of the hub, may be provided at the rear, at the side in conjunction with a well such as a fenderwell, or at any suitable part of the vehicle body. When the cover is locked to the hub in accordance with this invention, the spare wheel, tire and cover are rendered theft-proof.

The base 13 may, if desired, be slotted at 13a where it is bent to facilitate the bending operation in the manufacture thereof.

It may be desired to insure the return of the latches to retracted position. To this end, each latch 11a of Figures 9 and 10 is formed with a slot 41 along the cam portion 15a, and the free end of each actuating pin 33 is provided with a pilot 42 projecting through the slot and having an abutment 43 such as may be afforded by a cotter pin outwardly of the slot, whereby the pin 33 and spring 11a are slidably interlocked. When the pins 33 are moved rearwardly, they engage the inner surfaces of the cam portions 15a and force the springs 11a to locked positions. When the pins 33 are moved rearwardly, they force the springs 11a by engagement of the abutments 43 with the outer surfaces of the cam portions 15a. Thus in the event the spring latches become permanently set, they will nevertheless be moved into fully retracted position when removal of the cover is desired.

A cap (not shown) may be swingably mounted on the plate 4 so as to protect the keyhole from dust and the elements when not in use.

I am aware that many changes may be made and numerous details of construction may be varied through a wide range without departing from the principles of this invention, and I do not therefore purpose limiting the patent granted hereon otherwise than necessitated by the prior art.

I claim as my invention:

1. In combination with a spare wheel support having means accessible from the front through the wheel hub for mounting the spare wheel: releasable guard means for preventing access to said mounting means, mechanism for locking the guard means in operative position against unauthorized release, said mechanism comprising movable means arranged to be spaced from the hub to enable the guard means to be applied to and removed from the hub, or to be disposed behind a part of the hub and cooperate with the guard means in straddling a part of the hub to lock the guard means thereon, as desired, and key-controlled means movable axially and cooperating with the first movable means so as to cause the first movable means to occupy selectively either of said positions.

2. In combination with a spare wheel support having means accessible from the front through the wheel hub for mounting the spare wheel: releasable guard means for preventing access to said mounting means, mechanism for locking the guard means in operative position against unauthorized release, said mechanism comprising a member carried by the guard means and arranged to move transversely relative thereto, retaining means operatively associated with said member and movable substantially radially in response to movement of said member, so as to selectively interlock with or be released from the hub, as desired, and locking means for holding said retaining means in interlocked relation to the hub.

3. In a wheel assembly, the combination with a demountable wheel having an outer hub with an inner mounting hub, said outer hub having an inwardly turned annular flange at the outer end defining an aperture for the insertion of tools, of a removable cover for shielding at least a portion of the side of said wheel assembly, comprising a disc spaced from the end of said outer hub, resilient cam members carried by said disc and deflectable radially into engagement with the inside of said annular flange to draw said disc inwardly and axially of said wheel, a part of said disc in the locality of its periphery being brought into stressed engagement with a part of said wheel assembly under the influence of said cam members and axially operable means for exerting a cam action on said members to deflect them radially into engagement with said flange.

4. In a wheel assembly, the combination with a demountable wheel having an outer hub with an inner mounting hub, said outer hub having an inwardly turned annular flange at the outer end defining an aperture for the insertion of tools, of a removable resilient sheet metal cover for shielding at least a portion of the side of said wheel assembly, comprising a disc shaped member having a crowned central portion located over the end of said outer hub and spaced therefrom, resilient cam members carried by the said cover and receivable within said aperture, means for deflecting said cam members radially into engagement with the inside of said annular flange to draw said cover inwardly and axially of said wheel, a part of said cover in the locality of the periphery thereof being brought into stressed engagement with a part of said wheel assembly under the drawing in influence of said cam members and axially operable means for exerting a cam action on said members to deflect them radially into engagement with said flange.

5. A spare tire and wheel assembly comprising a demountable wheel having an outer hub with an inner mounting hub, the outer end of said outer hub having an inwardly turned annular flange defining an aperture for the insertion of tools, a detachable metal tire cover having a side portion covering the wheel and engaging the side wall of said tire, resilient cam members carried by said cover and receivable within said aperture and deflectable radially into engagement with the inside of said annular flange to draw said cover inwardly and axially of said wheel, said cover under the influence of said cam members being held in firm contact with the side wall of said tire and axially operable means for exerting a cam action on said members to deflect them radially into engagement with said flange.

6. A spare tire and wheel assembly comprising a demountable wheel having an apertured hub, a detachable metal tire cover having a side portion covering the side of the wheel and engaging the side wall of said tire, resilient means carried by said cover and deflectable radially into engagement with said hub to effect movement of said cover inwardly and axially of said wheel, the portion of said cover contacting with the side wall of said tire being held in firm engagement by said means and axially operable means for acting on said resilient means to bend same in a radial direction.

7. A spare tire and wheel assembly comprising a demountable wheel, a detachable metal tire cover having a side portion covering a side of the wheel and engaging the side wall of said tire, resilient means carried by the central part of said cover and deflectable radially into engagement with a part of said wheel adjacent the axis thereof to effect movement of said cover inwardly and axially of said wheel, the portion of said cover contacting with the side wall of said tire being held in firm engagement by said means and axially operable means for acting on said resilient means to bend same in a radial direction.

8. In combination with a spare tire and wheel assembly supported upon a vehicle body, a detachable metal cover shielding the outer side of the wheel, resilient means carried by the central part of said cover and deflectable radially into engagement with a part of the wheel adjacent the axis thereof to effect movement of said cover inwardly and axially of said wheel, a portion of said cover in the locality of its periphery being in contact with a fixed part and being held in firm engagement by said means and axially operable means for acting on said resilient means to bend same in a radial direction.

9. A spare tire and wheel assembly comprising a demountable wheel, a detachable tire cover of resilient sheet metal material having a side portion covering a side of the wheel and engaging the side wall of said tire, resilient cover securing means carried by the central part of said cover and formed to be sprung radially into engagement with a part of said wheel adjacent the axis thereof to effect movement of said cover inwardly and axially of said wheel, said cover being otherwise spaced from said wheel except at the point of engagement with said means, said cover being held in contact with said tire by said means and axially operable means for acting on said resilient means to spring same in a radial direction.

BLADEN M. SHORT.